March 11, 1924.   1,486,712
R. J. WILLIAMS
HOSE COUPLING
Filed March 28, 1921
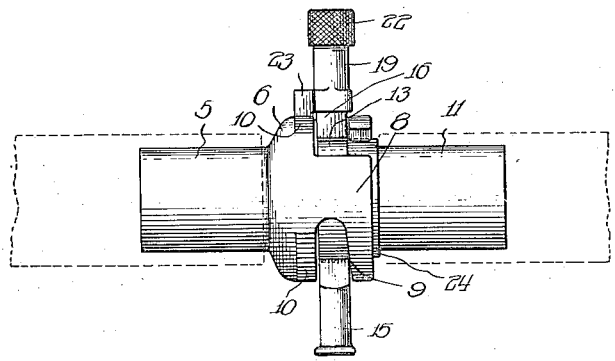
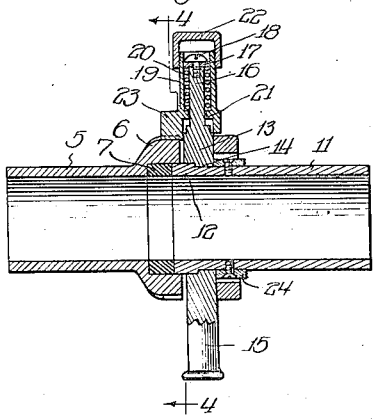
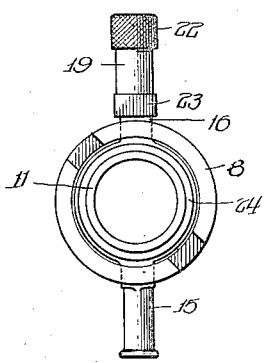 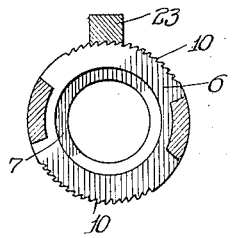
Witness:
R. Burkhardt
Inventor:
Richard J. Williams,
By D. Anthony Usina
Atty.

Patented Mar. 11, 1924.

1,486,712

UNITED STATES PATENT OFFICE.

RICHARD J. WILLIAMS, OF VIRGINIA, MINNESOTA.

HOSE COUPLING.

Application filed March 28, 1921. Serial No. 456,451.

*To all whom it may concern:*

Be it known that I, RICHARD J. WILLIAMS, a citizen of the United States, residing at Virginia, in the county of St. Louis and State of Minnesota, have invented certain new and useful Improvements in Hose Couplings, of which the following is a specification.

This invention relates to a new and improved pipe coupling, and more particularly to a coupling of this character which is capable of easy and rapid manipulation.

In various uses of couplings of this general character, such for example as connecting hose or pipe for a locomotive tank or steam shovel tank, it is highly desirable that the connection be capable of easy connection or disconnection and when connected be fully water-tight.

It is an object of the present invention to provide a connection of the character described which is adapted to positively maintain two pipe or hose elements connected together and which is capable of automatically locking itself in engaged position upon normal manipulation.

A further object is to provide a device which is simple in design and construction and which is substantially fool-proof and capable of withstanding heavy usage.

Other and further objects will appear as the description proceeds.

I have illustrated a preferred embodiment of my invention in the accompanying drawings, in which—

Figure 1 is an elevation showing my coupling in assembled relation;

Figure 2 is a longitudinal section of Figure 1;

Figure 3 is a view of Figure 1 as seen from the right; and

Figure 4 is a section on line 4—4 of Figure 2.

The socket member 5 is provided with the enlarged seating portion 6 having the compressible packing ring 7 seated therein. The axially and circumferentially extending arms 8 project from the socket member and their inner surfaces 9 incline inwardly toward the point of junction with the socket member. The outer surface of the member 5 is provided with a plurality of serrations adjacent the inclined portions of the arms.

The second member 11 is provided with the shouldered end portion 12 adapted to engage the packing ring 7 in the socket member. The locking ring 13 is provided with a shoulder 14 engaging behind the shoulder upon the member 11. The ring 13 is retained against longitudinal displacement away from the end of the member by means of the fixed ring 13. This ring 13 is provided with the oppositely extending arms 15 and 16. The arm 16 is reduced in size and is provided on its outer end with the washer 17 secured in place by the screw 18. The sleeve 19 surrounds the arm 16 and the spring 20 bears upon the inner face of the washer 17 and upon the shoulder 21 formed on the sleeve. The sleeve is provided with the cap 22 and with the foot 23, the latter being formed with a plurality of serrations adapted to coact with the serrations 10 upon the socket member.

In connecting my pipe sections the member 11 is brought into the socket member 6, the two arms 15 and 16 passing between the arms 8 and then being rotated so that they engage the cam surfaces 9. As the ring 13 is rotated by means of these arms the cam action of the arms presses the members firmly together and compresses the packing ring 7. Also the sleeve 19 is lifted against the spring 20 by the engagement of the serrated teeth upon the foot 23 with the similar teeth upon the socket member. Due to the incline of these teeth as shown in Figure 4 the ring is positively locked against reverse movement. In order to disconnect the coupling sections it is necessary to withdraw the foot 23 from engagement with the serrations upon the socket member by pulling outwardly upon the sleeve 16. The collar is then rotated in the reverse direction and the sections separated when the arms 15 and 16 clear the ends of the arms 8.

The device is simple in design, composed of comparatively few parts and yet automatically and positively locks pipe or hose sections in water-tight relation upon a turn of the locking ring. It is positively locked against accidental disconnection and yet is capable of ready disconnection upon actuation of the sleeve to release the engagement between the foot and the socket member.

I claim:

In a pipe coupling, an enlarged socket member having a seat therein, a compressible packing in said seat, oppositely positioned axially and circumferentially extending arms carried by the member, the surface of the arms adjacent the body portion of the member being inclined inwardly toward the point of junction with the body, the body opposite said inclined portion of the arms being provided with axially extending serrations, a second member having a face adapted to fit into said socket member and engage the packing, a shoulder on said member, a rotatable locking ring fitted behind said shoulder and retained in place by a fixed ring secured to the member, oppositely located arms extending from the locking ring and provided with surfaces adapted to engage the inclined surfaces of the body member arms, said arms being provided with extensions for manual operation, a sleeve fitting about one of said arms and radially movable thereon, a washer carried by the end of the arm, a spring surrounding the arm and engaging the inner face of the washer and spring in such manner as to urge the sleeve inwardly, and a serrated foot carried by the sleeve and adapted to engage the serrations upon the body member to automatically and adjustably lock the ring and thus the second member to the socket member.

Signed at Virginia, Minnesota, this 22nd day of March, 1921.

RICHARD J. WILLIAMS.

In presence of—
  E. G. JOHNSON,
  BRITON C. PROUT.